(12) United States Patent
Mercuri

(10) Patent No.: US 6,413,663 B1
(45) Date of Patent: Jul. 2, 2002

(54) FLUID PERMEABLE FLEXIBLE GRAPHITE FUEL CELL ELECTRODE

(75) Inventor: Robert Angelo Mercuri, Seven Hills, OH (US)

(73) Assignee: Graftech Inc., Wilmington, DE (US)

( * ) Notice: Subject to any disclaimer, the term of this patent is extended or adjusted under 35 U.S.C. 154(b) by 92 days.

(21) Appl. No.: 09/606,511

(22) Filed: Jun. 29, 2000

(51) Int. Cl.⁷ .............................................. H01M 8/10
(52) U.S. Cl. ........................... 429/30; 429/34; 429/30; 429/39; 429/40
(58) Field of Search ........................... 429/34, 36, 39, 429/40, 30

(56) References Cited

U.S. PATENT DOCUMENTS

| | | | |
|---|---|---|---|
| 3,404,061 A | 10/1968 | Shane et al. .................. 161/125 |
| 4,190,257 A | 2/1980 | Schnitzler .................... 277/102 |
| 4,226,821 A | 10/1980 | Ishikawa et al. ............. 264/134 |
| 4,752,518 A | 6/1988 | Lohrke et al. ................ 428/131 |
| 4,826,181 A | 5/1989 | Howard ........................ 277/112 |
| 4,891,279 A | * 1/1990 | Joo et al. ...................... 429/40 |
| 4,895,713 A | 1/1990 | Greinke et al. ............. 423/448 |
| 4,988,583 A | 1/1991 | Watkins et al. ............... 429/30 |
| 5,102,855 A | 4/1992 | Greinke et al. ............. 502/425 |
| 5,108,849 A | 4/1992 | Watkins et al. ............... 429/30 |
| 5,176,863 A | 1/1993 | Howard ........................ 264/113 |
| 5,225,262 A | 7/1993 | Leduc ............................ 428/75 |
| 5,225,379 A | 7/1993 | Howard ........................ 501/99 |
| 5,228,701 A | 7/1993 | Greinke et al. ............. 277/102 |
| 5,300,370 A | 4/1994 | Washington et al. .......... 429/34 |
| 5,476,679 A | 12/1995 | Lewis et al. ................. 427/122 |
| 5,494,506 A | 2/1996 | Ford et al. ...................... 55/502 |
| 5,531,454 A | 7/1996 | Borneby ........................ 277/26 |
| 5,683,778 A | 11/1997 | Crosier ......................... 428/59 |
| 5,707,755 A | 1/1998 | Grot .............................. 429/40 |
| 5,902,762 A | 5/1999 | Mercuri et al. ............... 501/99 |
| 5,976,726 A | 11/1999 | Wilkinson et al. ............ 429/35 |
| 5,981,098 A | 11/1999 | Vitale ........................... 429/34 |
| 6,087,034 A | * 7/2000 | Mercuri ......................... 429/44 |

FOREIGN PATENT DOCUMENTS

| | | | |
|---|---|---|---|
| EP | 0248918 | 6/1986 | |
| JP | 54-88911 | 7/1979 | |
| JP | 63-157747 | 6/1988 | |
| JP | 63242395 | 10/1988 | ............. C02F/3/10 |
| JP | 1123991 | 5/1989 | |
| JP | 81-143856 | 6/1996 | |
| JP | 8169478 | 7/1996 | ........... B65D/81/34 |

\* cited by examiner

*Primary Examiner*—Carol Chaney
*Assistant Examiner*—Dah-Wei Yuan
(74) *Attorney, Agent, or Firm*—James R. Cartiglia

(57) ABSTRACT

A membrane electrode assembly is provided. More particularly, an assembly is provided which includes a pair of electrodes and an ion exchange membrane positioned between the electrodes, at least one of the electrodes being formed of a sheet of a compressed mass of expanded graphite particles having a plurality of transverse fluid channels passing through the sheet between first and second opposed surfaces of the sheet, one of opposed surfaces abutting the ion exchange membrane. The surfaces of at least some of the transverse fluid channels have glassy carbon thereon or therein.

15 Claims, 6 Drawing Sheets

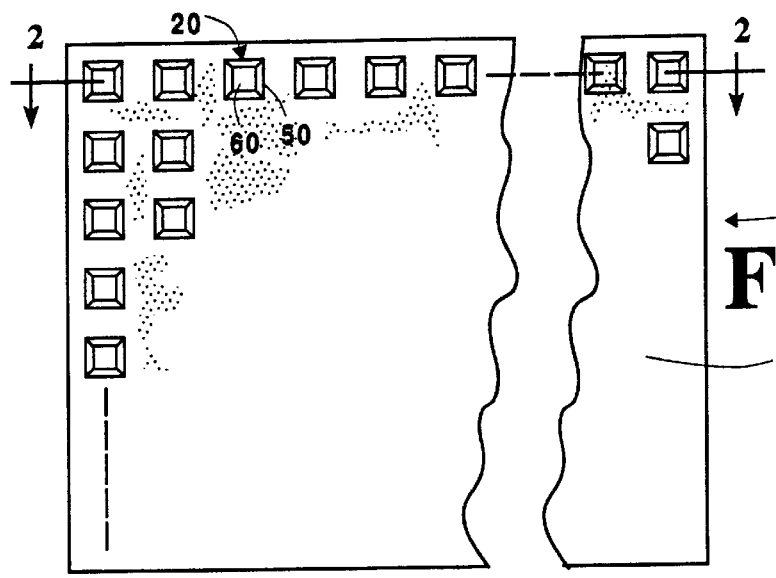
 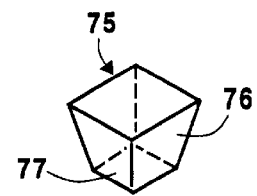
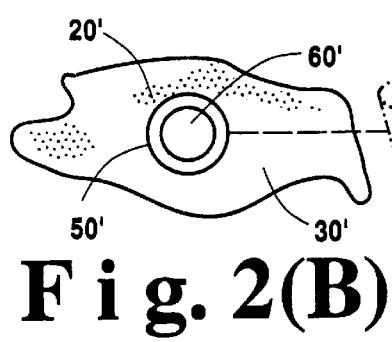 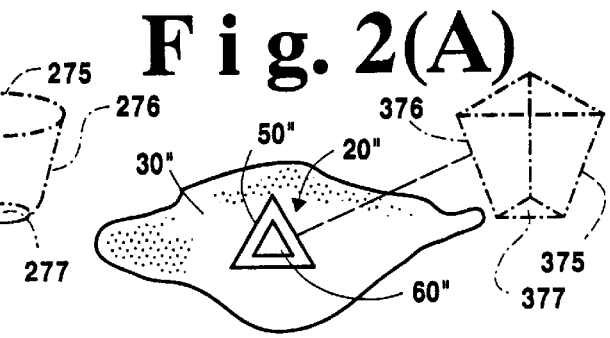
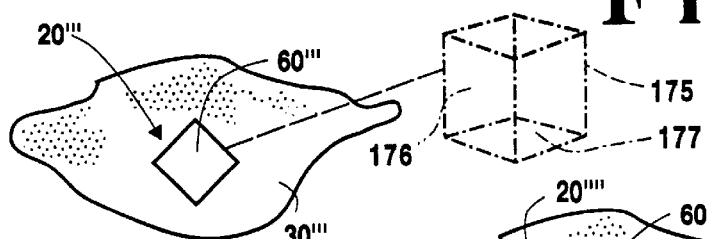
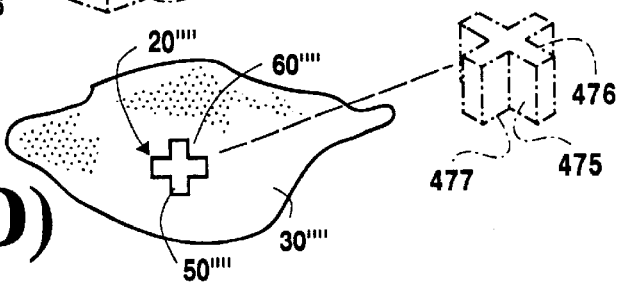

FLUID PERMEABLE FLEXIBLE GRAPHITE FUEL CELL ELECTRODE

TECHNICAL FIELD

This invention relates to an electrode assembly for an electrochemical fuel cell that includes an article formed of flexible graphite sheet that is fluid permeable and has enhanced isotropy with respect to thermal and electrical conductivity. The graphite article has activated carbon therein or thereon, which has catalyst material loaded thereon.

BACKGROUND OF THE INVENTION

An ion exchange membrane, more specifically a proton exchange membrane (PEM), fuel cell produces electricity through the chemical reaction of hydrogen and oxygen in the air. Within the fuel cell, an anode and cathode surround a polymer electrolyte. A catalyst material stimulates hydrogen molecules to split into hydrogen atoms and through an internal load at the membrane the atoms each split into a proton and an electron. The electrons generated are utilized as electrical energy. ,The protons migrate through the electrolyte, combine with oxygen from the air and electrons and form water.

A PEM fuel cell is advantageously formed of a membrane electrode assembly sandwiched between two graphite flow field plates. Conventionally, the membrane electrode assembly consists of electrodes (anode and cathode) with a thin layer of a catalyst material, particularly platinum or a platinum group metal coated on graphite or carbon particles, bonded to either side of a proton exchange membrane disposed between the electrodes. In operation, hydrogen flows through channels in one of the flow field plates to the anode, where the catalyst in proximity to the electrode and membrane promotes its separation into protons and electrons. Air flows through the channels in the other flow field plate to the cathode, where the oxygen in the air attracts the protons through the proton exchange membrane and the electrons through the circuit, which join to form water. Since electrons cannot pass through the PEM, they travel through the anode, through a circuit in which the electricity is utilized, and back to the cathode. The air stream on the cathode side removes the water formed by combination of the hydrogen and oxygen. Combinations of such fuel cells are used in a fuel cell stack to provide the desired results.

One limiting factor to the more widespread use of PEM fuel cells is the cost of the catalyst material. Metals such as platinum and the other platinum group metals are relatively expensive, especially as compared to the other elements of the cell, such as the graphite flow field plates. In conventional fuel cells, the catalyst material is bonded to the PEM or the electrodes in a non-selective manner. That is, the catalyst material is distributed relatively uniformly on the opposed surfaces of the PEM, with result that catalyst deployment is not as efficient as possible.

Graphites are made up of layer planes of hexagonal arrays or networks of carbon atoms. These layer planes of hexagonally arranged carbon atoms are substantially flat and are oriented or ordered so as to be substantially parallel and equidistant to one another. The substantially flat, parallel equidistant sheets or layers of carbon atoms, usually referred to as basal planes, are linked or bonded together and groups thereof are arranged in crystallites. Highly ordered graphites consist of crystallites of considerable size: the crystallites being highly aligned or oriented with respect to each other and having well ordered carbon layers. In other words, highly ordered graphites have a high degree of preferred crystallite orientation. It should be noted that graphite exhibits anisotropy because of its inherent structure and thus exhibit or possess many properties that are highly directional e.g. thermal and electrical conductivity and fluid diffusion. Briefly, graphites may be characterized as laminated structures of carbon, that is, structures consisting of superposed layers or laminae of carbon atoms joined together by weak van der Waals forces. In considering the graphite structure, two axes or directions are usually noted, to wit, the "c" axis or direction and the "a" axes or directions. For simplicity, the "c" axis or direction may be considered as the direction perpendicular to the carbon layers. The "a" axes or directions may be considered as the directions parallel to the carbon layers or the directions perpendicular to the "c" direction. The graphites suitable for manufacturing flexible graphite possess a very high degree of orientation.

As noted above, the bonding forces holding the parallel layers of carbon atoms together are only weak van der Waals forces. Natural graphites can be treated so that the spacing between the superposed carbon layers or laminae can be appreciably opened up so as to provide a marked expansion in the direction perpendicular to the layers, that is, in the "c" direction and thus form an expanded or intumesced graphite structure in which the laminar character of the carbon layers is substantially retained.

Natural graphite flake which has been greatly expanded and more particularly expanded so as to have a final thickness or "c" direction dimension which is as much as about 80 or more times the original "c" direction dimension can be formed without the use of a binder into cohesive or integrated flexible graphite sheets of expanded graphite, e.g. webs, papers, strips, tapes, or the like. The formation of graphite particles which have been expanded to have a final thickness or "c" dimension which is at least about 80 times the original "c" direction dimension into integrated flexible sheets by compression, without the use of any binding material is believed to be possible due to the excellent mechanical interlocking, or cohesion which is achieved between the voluminously expanded graphite particles.

In addition to flexibility, the sheet material, as noted above, has also been found to possess a high degree of anisotropy with respect to thermal and electrical conductivity and fluid diffusion, comparable to the natural graphite starting material due to orientation of the expanded graphite particles substantially parallel to the opposed faces of the sheet resulting from very high compression, e.g. roll pressing. Sheet material thus produced has excellent flexibility, good strength and a very high degree of orientation.

Briefly, the process of producing flexible, binderless anisotropic graphite sheet material, e.g. web, paper, strip, tape, foil, mat, or the like, comprises compressing or compacting under a predetermined load and in the absence of a binder, expanded graphite particles which have a "c" direction dimension which can vary between up to about 10 times and as much as about 80 times or greater than that of the original particles so as to form a substantially flat, flexible, integrated graphite sheet. The expanded graphite particles which generally are worm-like or vermiform in appearance, once compressed, will maintain the compression set and alignment with the opposed major surfaces of the sheet. The density and thickness of the sheet material can be varied by controlling the degree of compression. The density of the sheet material can be within the range of from about 5 pounds per cubic foot to about 125 pounds per cubic foot. The flexible graphite sheet material exhibits an appreciable degree of anisotropy due to the alignment of graphite particles parallel to the major opposed, parallel surfaces of the sheet, with the degree of anisotropy increasing upon roll pressing of the sheet material to increased density. In roll pressed anisotropic sheet material, the thickness, i.e. the direction perpendicular to the opposed, parallel sheet surfaces comprises the "c" direction and the directions ranging along the length and width, i.e. along or parallel to the opposed, major surfaces comprises the "a" directions and the thermal, electrical and fluid diffusion properties of the sheet are very different, by orders of magnitude, for the "c" and "a" directions.

This very considerable difference in properties, i.e. anisotropy, which is directionally dependent, can be disadvantageous in some applications. For example, in gasket applications where flexible graphite sheet is used as the gasket material and in use is held tightly between metal surfaces, the diffusion of fluid, e.g. gases or liquids, occurs more readily parallel to and between the major surfaces of the flexible graphite sheet. It would, in most instances, provide for greater gasket performance, if the resistance to fluid flow parallel to the major surfaces of the graphite sheet ("a" direction) were increased, even at the expense of reduced resistance to fluid diffusion flow transverse to the major faces of the graphite sheet ("c" direction). With respect to electrical properties, the resistivity of anisotropic flexible graphite sheet is high in the direction transverse to the major surfaces ("c" direction) of the flexible graphite sheet, and very substantially less in the direction parallel to and between the major faces of the flexible graphite sheet ("a" direction). In applications such as fluid flow field plates for fuel cells and seals for fuel cells, it would be of advantage if the electrical resistance transverse to the major surfaces of the flexible graphite sheet ("c" direction) were decreased, even at the expense of an increase in electrical resistivity in the direction parallel to the major faces of the flexible graphite sheet ("a" direction).

With respect to thermal properties, the thermal conductivity of a flexible graphite sheet in a direction parallel to the upper and lower surfaces of the flexible graphite sheet is relatively high, while it is relatively very low in the "c" direction transverse to the upper and lower surfaces.

The foregoing situations are accommodated by the present invention.

SUMMARY OF THE INVENTION

The present invention provides an article useful in a membrane electrode assembly for an electrochemical fuel cell comprising a pair of electrodes and an ion exchange membrane positioned between the electrodes, at least one of the electrodes being formed of a sheet of a compressed mass of expanded graphite particles having a plurality of transverse fluid channels passing through the sheet between first and second opposed surfaces of the sheet, one of the opposed surfaces abutting the ion exchange membrane, the transverse fluid channels being formed by mechanically impacting an opposed surface of the sheet to displace graphite within the sheet at predetermined locations. The transverse fluid channels are adjacently positioned and separated by walls of compressed expanded graphite. At least a portion of the walls of at least some of the transverse fluid channels have an adherent coating of activated carbon thereon or activated carbon distributed therein, the activated carbon loaded with catalyst.

BRIEF DESCRIPTION OF THE DRAWINGS

FIG. 1 is a plan view of a transversely permeable sheet of flexible graphite having transverse channels in accordance with the present invention;

FIG. 1(A) shows a flat-ended protrusion element used in making the channels in the perforated sheet of FIG. 1;

FIG. 2 is a side elevation view in section of the sheet of FIG. 1;

FIGS. 2(A), (B), (C), (D) show various suitable flat-ended configurations for transverse channels in accordance with the present invention;

DETAILED DESCRIPTION OF THE INVENTION

Figure 3:
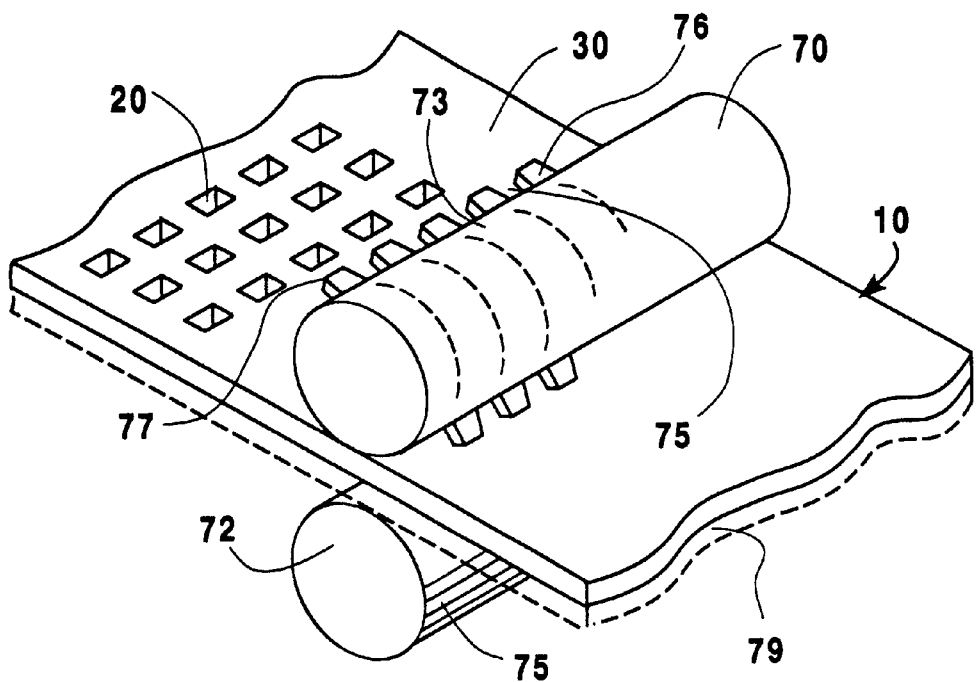
FIGS. 3, 3(A) shows a mechanism for making the article of FIG. 1.
Figure 3A:
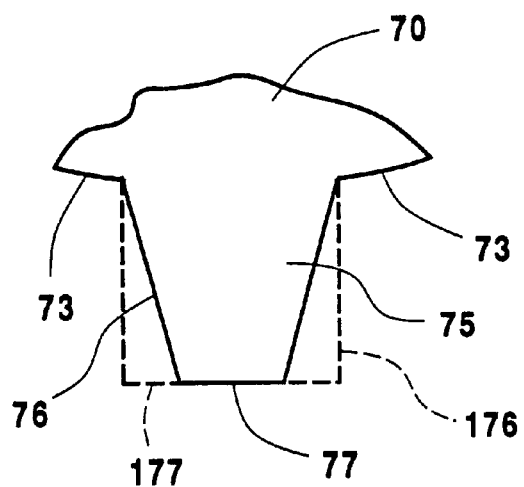

Graphite is a crystalline form of carbon comprising atoms covalently bonded in flat layered planes with weaker bonds between the planes. By treating particles of graphite, such as natural graphite flake, with an intercalant of, e.g. a solution of sulfuric and nitric acid, the crystal structure of the graphite reacts to form a compound of graphite and the intercalant. The treated particles of graphite are hereafter referred to as "particles of intercalated graphite". Upon exposure to high temperature, the particles of intercalated graphite expand in dimension as much as about 80 or more times their original volume in an accordion-like fashion in the "c" direction, i.e. in the direction perpendicular to the crystalline planes of the graphite. The expanded graphite particles can then be formed into flexible graphite sheet.

A common method for manufacturing graphite sheet, e.g. foil from flexible graphite is described by Shane et al. in U.S. Pat. No. 3,404,061, the disclosure of which is incorporated herein by reference. In the typical practice of the Shane et al. method, natural graphite flakes are intercalated by dispersing the flakes in a solution containing an oxidizing agent of, e.g. a mixture of nitric and sulfuric acid. The intercalation solution contains oxidizing and other intercalating agents known in the art. Examples include those containing oxidizing agents and oxidizing mixtures, such as solutions containing nitric acid, potassium chlorate, chromic acid, potassium permanganate, potassium chromate, potassium dichromate, perchloric acid, and the like, or mixtures, such as for example, concentrated nitric acid and chlorate, chromic acid and phosphoric acid, sulfuric acid and nitric acid, or mixtures of a strong organic acid, e.g. trifluoroacetic acid, and a strong oxidizing agent soluble in the organic acid. Alternatively, an electric potential can be used to bring about oxidation of the graphite. Chemical species that can be introduced into the graphite crystal using electrolytic oxidation include sulfuric acid as well as other acids.

In a preferred embodiment, the intercalating agent is a solution of a mixture of sulfuric acid, or sulfuric acid and phosphoric acid, and an oxidizing agent, i.e. nitric acid, perchloric acid, chromic acid, potassium permanganate, hydrogen peroxide, iodic or periodic acids, or the like. Although less preferred, the intercalation solutions may contain metal halides such as ferric chloride, and ferric chloride mixed with sulfuric acid, or a halide, such as bromine as a solution of bromine and sulfuric acid or bromine in an organic solvent.

After the flakes are intercalated, any excess solution is drained from the flakes and the flakes are water-washed. The quantity of intercalation solution retained on the flakes after draining may range from about 20 to 150 parts of solution by weight per 100 parts by weight of graphite flakes (pph) and more typically about 50 to 120 pph. Alternatively, the quantity of the intercalation solution may be limited to between about 10 to 50 parts of solution per hundred parts of graphite by weight (pph) which permits the washing step to be eliminated as taught and described in U.S. Pat. No. 4,895,713, the disclosure of which is also herein incorporated by reference. The thus treated particles of graphite are sometimes referred to as "particles of intercalated graphite." Upon exposure to high temperature, e.g. about 700° C. to 1000° C. and higher, the particles of intercalated graphite expand as much as about 10, and more desirably, about 80 to 1000 or more times their original volume in an accordion-like fashion in the c-direction, i.e. in the direction perpendicular to the crystalline planes of the constituent graphite particles. The expanded (or exfoliated) graphite particles are vermiform in appearance, and are therefore commonly referred to as worms. The worms may be compressed together into flexible sheets that, unlike the original graphite flakes, can be formed and cut into various shapes and provided with small transverse openings by deforming mechanical impact as hereinafter described.

Flexible graphite sheet and foil are coherent, with good handling strength, and are suitably compressed, e.g. by roll-pressing, to a thickness of about 0.07 to 4.0 millimeters ("mm") and a density of about 0.1 to 1.5 grams per cubic centimeter. From about 1.5–30% by weight of ceramic additives, can be blended with the intercalated graphite flakes as described in U.S. Pat. No. 5,902,762 (which is incorporated herein by reference) to provide enhanced resin impregnation in the final flexible graphite product. The additives include ceramic fiber particles having a length of about 0.15 to 1.5 mm. The width of the particles is suitably from about 0.04 to 0.004 mm. The ceramic fiber particles are non-reactive and non-adhering to graphite and are stable at temperatures up to about 1090° C., preferably at least about 1370° C. Suitable ceramic fiber particles are formed of macerated quartz glass fibers, carbon and graphite fibers, zirconia, boron nitride, silicon carbide and magnesia fibers, naturally occurring mineral fibers such as calcium metasilicate fibers, calcium aluminum silicate fibers, aluminum oxide fibers and the like.

The flexible graphite sheet can also, at times, be advantageously treated with resin and the absorbed resin, after curing, enhances the moisture resistance and handling strength, i.e. stiffness of the flexible graphite sheet. Suitable resin content is preferably about 20 to 30% by weight, suitably up to about 60% by weight.

In the practice of this invention, the flexible graphite sheet is provided with channels, which are preferably smooth-sided, and which pass between the parallel, opposed surfaces of the flexible graphite sheet, and are separated by walls of compressed expandable graphite. It is the upper edges of the walls of the flexible graphite sheet that actually abut the ion exchange membrane, when the inventive flexible graphite sheet functions as an electrode in an electrochemical fuel cell.

The channels preferably have openings on one of the opposed surfaces that are larger than the openings in the other opposed surface. The channels can have different configurations, which can be formed, for instance, using flat-ended protrusion elements of different shapes. The smooth flat-ends of the protrusion elements preferably ensure deformation and complete if displacement of graphite within the flexible graphite sheet, i.e. there are no rough or ragged edges or debris resulting from the channel-forming impact. Preferred protrusion elements have decreasing cross-section in the direction away from the pressing roller to provide larger channel openings on the side of the sheet that is initially impacted. The development of smooth, unobstructed surfaces surrounding channel openings enables the free flow of fluid into and through smooth-sided channels. In a preferred embodiment, openings one of the opposed surfaces are larger than the channel openings in the other opposed surface, e.g. from 1 to 200 times greater in area, and result from the use of protrusion elements having converging sides. The channels are formed in the flexible graphite sheet at a plurality of locations by mechanical impact. The fact that channel locations can be predetermined can be extremely advantageous. For instance, the channels can be arrayed so as to lie contiguous with the fluid flow groove of a fuel cell fluid flow plate, thus ensuring that hydrogen and/or oxygen flow between the fluid flow plate and the membrane, through the inventive electrode is maximized or is at least as efficient as possible.

In the course of impacting the flexible graphite sheet to form channels, graphite is displaced within the sheet to disrupt and deform the parallel orientation of the expanded graphite particles. In effect the displaced graphite is being "die-molded" by the sides of adjacent protrusions and the smooth surface of the roller. This reduces the anisotropy in the flexible graphite sheet and thus increases the electrical and thermal conductivity of the sheet in the direction transverse to the opposed surfaces. A similar effect is achieved with frusto-conical and parallel-sided peg-shaped flat-ended protrusions.

In order to provide an adherent coating of glassy carbon on the surfaces of at least some of the channels, i.e. on the walls of at least some of the channels, the sheet of compressed expanded graphite particles is coated with a thermosettable organic resin (such as a phenolic or epoxy resin) by means of roll, spray, gauge, or dip methods depending upon the coating thickness desired; the coated sheet is heated to dry and set the resin (at a temperature of, e.g., about 100° to about 250° C. or higher); the dried sheet is mechanically impacted to form transverse channels as described hereinabove; and the channeled sheet is heat treated, preferably in an inert atmosphere, to about 500° C.–1600° C. to form the glassy carbon coating. Alternatively, the resin can be applied, and glassy carbon formed, after formation of the transverse channels through the compressed expanded graphite sheet.

In another embodiment, the thermosettable organic resin impregnates the flexible graphite sheet such that conversion of the resin to glassy carbon as described about results in glassy carbon distributed within the walls of at least some of the transverse channels. Indeed, since the inventive graphite sheet can be relatively porous, coating of the resin on the sheet can also lead to at least partial impregnation, with result that glassy carbon is formed both on the wall surfaces and within the walls.

The principal groups of resins suitable for use in this invention are epoxies, phenolics, urethanes and polymers of furfural and furfuryl alcohol. The preferred phenolics are phenol-formaldehyde and resorcinol-formaldehyde. Furan based polymers derived from furfural or furfuryl alcohol are also suitable. The resin system should preferably give a carbon yield in excess of about 20% and have a viscosity below about 200–300 centipoises (cps). In addition to solutions of phenolics in furfural and furfuryl alcohol, straight furfural or furfuryl alcohol can be used with a catalyst. For example, a solution of furfural and an acid catalyst could be coated on, or impregnated in, the graphite sheet.

The glassy carbon coated perforated fluid permeable flexible graphite sheet can then be activated by known techniques, such as by exposure to high temperature in the presence of oxygen, air, ozone, chlorine gas or, most advantageously, steam, for sufficient time to activate some or all of the surface of the glassy carbon 68 layer or impregnant (which oxidizes and, thus, activates preferentially to the flexible graphite sheet itself). The particular time and temperature of exposure are interrelated and depend on the nature of the oxidant and the time desired for the reaction. For instance, with air as the oxidant, a temperature of 450° C. will accomplish the same degree of activation in several days as ozone at 100° C. for less than 10 seconds. When steam is the oxidant, temperatures of about 700° C. or higher, for from about 5 to 15 minutes are appropriate.

Catalyst metal, such as platinum or a platinum group metal, can then be loaded on the activated surfaces. In operation, the reaction catalyzed by the catalyst metal, that is, the dissociation of hydrogen molecules into atoms and, in the presence of the membrane and load, into constituent protons and electrons, and the re-association of the protons and electrons, in combination with oxygen, into water, occurs at the point where the surfaces of the electrode meet (or abut) the ion exchange membrane. It is at this location and, effectively, only at this location, where dissociated electrons can be conducted along the electrode and dissociated protons can migrate across the membrane (and vice versa with respect to the cathodic side of the fuel cell). Thus, it is only on the walls of the channels formed in the sheet, at or near where the walls abut the ion exchange membrane, where catalyst needs to be loaded.

If activation of the glassy carbon coating is insufficient for catalyst loading or undesirable, a high surface area strongly adhering coating can be obtained by including about 2 to 20 weight percent cellulosic material (e.g. milled newspaper) in the thermosettable resin. The cellulosic material suitably includes an activating material, e.g. phosphoric acid, and the cellulosic char, formed in and on the glassy carbon coating, and the surface of the glassy carbon coating is activated by heating in an oxidizing atmosphere at 700° C. for a few minutes.

DETAILED DESCRIPTION OF THE PREFERRED EMBODIMENT

With reference to FIG. 1 and FIG. 2, a compressed mass of expanded graphite particles, in the form of a flexible graphite sheet is shown at 10. The flexible graphite sheet 10 is provided with channels 20, which are preferably smooth-sided as indicated at 67 in FIGS. 5 and 8, and which pass between the opposed surfaces 30, 40 of flexible graphite sheet 10, and are separated by walls 3 of compressed expandable graphite. The channels 20 preferably have openings 50 on one of the opposed surfaces 30 which are larger than the openings 60 in the other opposed surface 40. The channels 20 can have different configurations as shown at 20'–20'''' in FIGS. 2(A), 2(B), 2(C), 2(D) which are formed using flat-ended protrusion elements of different shapes as shown at 75, 175, 275, 375, 475 in FIGS. 1(A) and 2(A), 2(B), 2(C), 2(D) suitably formed of metal, e.g. steel and integral with and extending from the pressing roller 70 of the impacting device shown in FIG. 3. The smooth flat-ends of the protrusion elements, shown at 77, 177, 277, 377, 477, and the smooth bearing surface 73, of roller 70, and the smooth bearing surface 78 of roller 72 (or alternatively flat metal plate 79), ensure deformation and complete displacement of graphite within the flexible graphite sheet, i.e. there are no rough or ragged edges or debris resulting from the channel-forming impact. Preferred protrusion elements have decreasing cross-section in the direction away from the pressing roller 70 to provide larger channel openings on the side of the sheet that is initially impacted. The development of smooth, unobstructed surfaces 63 surrounding channel openings 60, enables the free flow of fluid into and through smooth-sided (at 67) channels 20.

Figure 4:
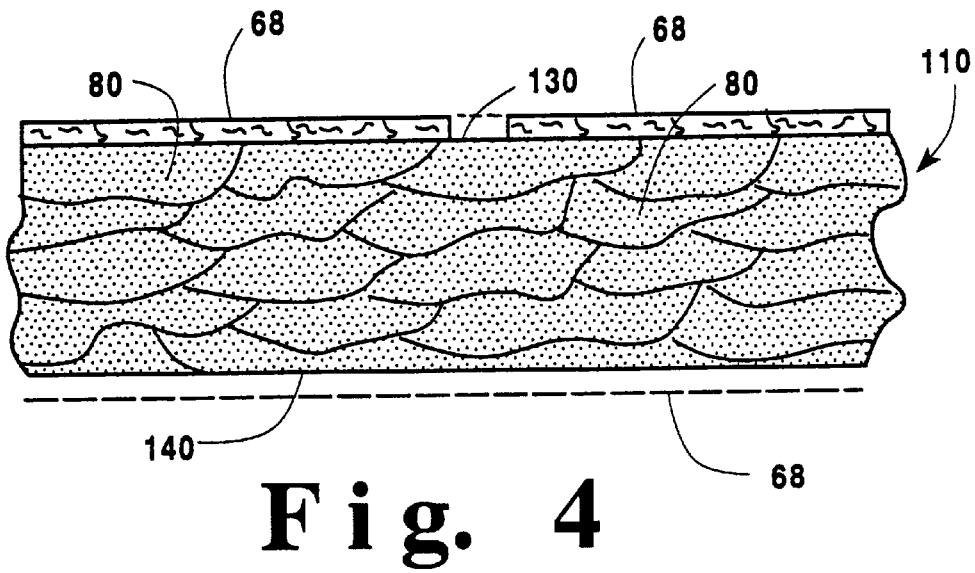
FIG. 4 shows an enlarged sketch of an elevation view of the oriented expanded graphite particles of flexible graphite sheet material having a glassy carbon coating.

In a preferred embodiment, openings one of the opposed surfaces are larger than the channel openings in the other opposed surface, e.g. from 1 to 200 times greater in area, and result from the use of protrusion elements having converging sides such as shown at 76, 276, 376. The channels 20 are formed in the flexible graphite sheet 10 at a plurality of pre-determined locations by mechanical impact at the pre-determined locations in sheet 10 using a mechanism such as shown in FIG. 3 comprising a pair of steel rollers 70, 72 with one of the rollers having truncated, i.e. flat-ended, prism-shaped protrusions 75 which impact surface 30 of flexible graphite sheet 10 to displace graphite and penetrate sheet 10 to form open channels 20. In practice, both rollers 70, 72 can be provided with "out-of-register" protrusions, and a flat metal plate indicated at 79, can be used in place of smooth-surfaced roller 72. FIG. 4 is an enlarged sketch of a sheet of flexible graphite 110 having a coating of glassy carbon 68 thereon, which shows a typical orientation of compressed expanded graphite particles 80 substantially parallel to the opposed surfaces 130, 140.

Figure 5:
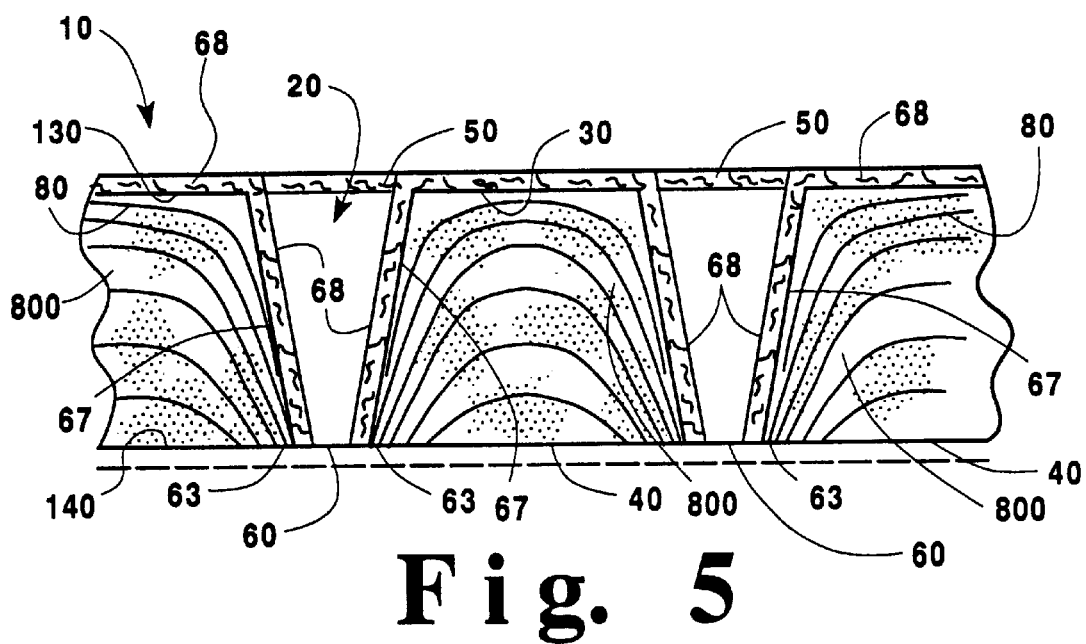
FIG. 5 is a sketch of an enlarged elevation view of an activated, glassy carbon-coated article formed of flexible graphite sheet in accordance with the present invention.

This orientation of the expanded graphite particles 80 results in anisotropic properties in flexible graphite sheets; i.e. the electrical conductivity and thermal conductivity of the sheet being substantially lower in the direction transverse to opposed surfaces 130, 140 ("c" direction) than in the direction ("a" direction) parallel to opposed surfaces 130, 140. In the course of impacting flexible graphite sheet 10 to form channels 20, as illustrated in FIG. 3, graphite is displaced within flexible graphite sheet 10 by flat-ended (at 77) protrusions 75 to push aside graphite as it travels to and bears against smooth surface 73 of roller 70 to disrupt and deform the parallel orientation of expanded graphite particles 80 as shown at 800 in FIG. 5. This region of 800, adjacent channels 20, shows disruption of the parallel orientation into an oblique, non-parallel orientation is optically observable at magnifications of 100× and higher. In effect the displaced graphite is being "die-molded" by the sides 76 of adjacent protrusions 75 and the smooth surface 73 of roller 70 as illustrated in FIG. 5. This reduces the anisotropy in flexible graphite sheet 10 and thus increases the electrical and thermal conductivity of sheet 10 in the direction transverse to the opposed surfaces 30, 40. A similar effect is achieved with frusto-conical and parallel-sided peg-shaped flat-ended protrusions 275 and 175.

The glassy carbon coating 68 and/or impregnant on the surfaces of flexible graphite sheet 10 is achieved by deforming a glassy carbon coated flexible graphite sheet, such as shown in FIG. 4, or by treating a channeled sheet such as shown in FIG. 1, with a resin solution and subsequently converting the resin to glassy carbon. Alternatively, a resin treated sheet can be channeled and the resin then converted to glassy carbon. The glassy carbon coated and/or loaded perforated fluid permeable flexible graphite sheet 10 of FIG. 5 can then be activated by known techniques, such as by exposure to high temperature in the presence of oxygen, air, ozone, chlorine gas or, most advantageously, steam, for sufficient time to activate some or all of the surface of the glassy carbon 68. Catalyst metal 600 can then be loaded on the activated carbon, most advantageously at or near the locations where the edges of the channel walls are to abut an ion exchange membrane in an electrochemical fuel cell.

Figure 6:
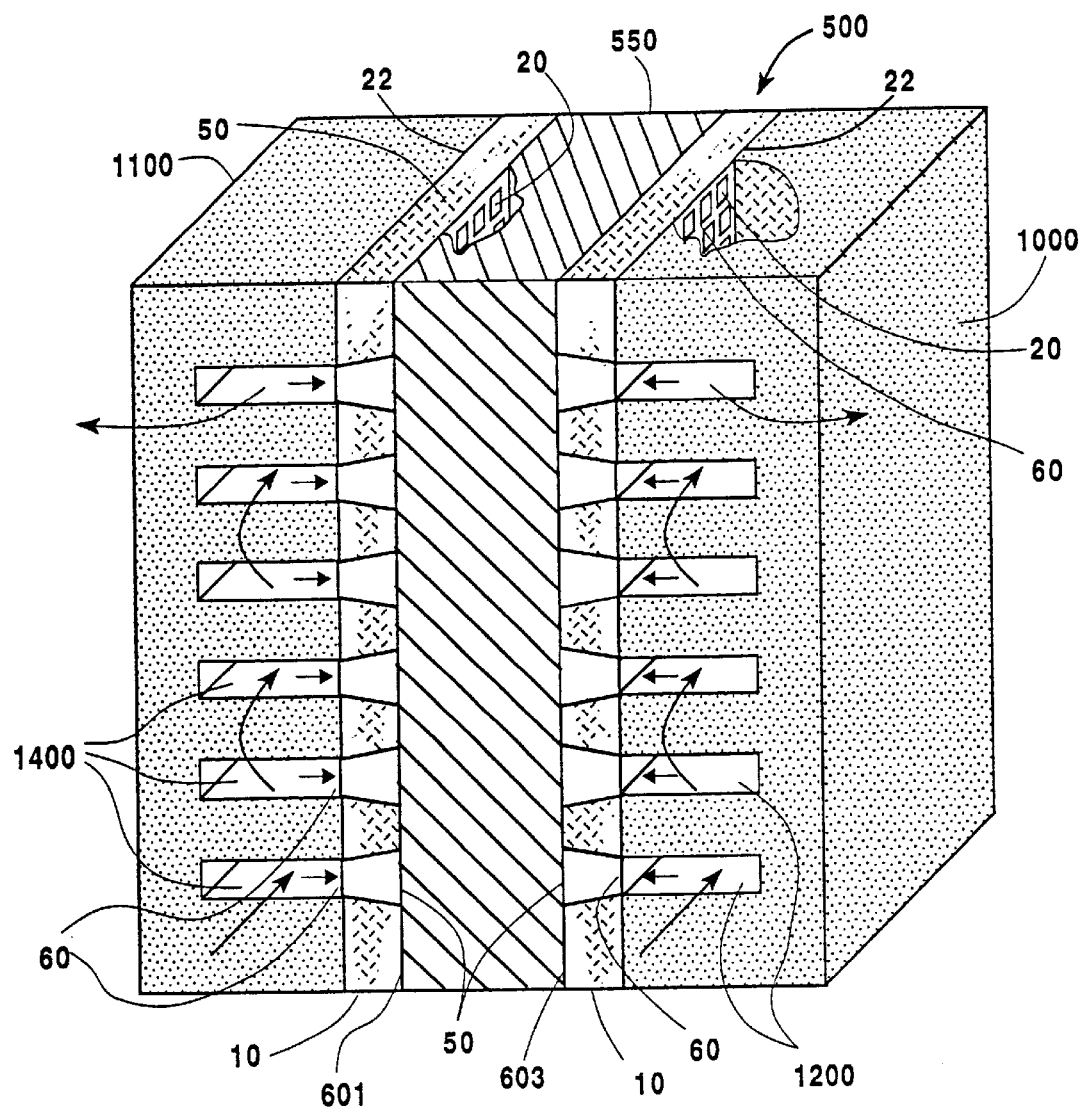
FIGS. 6, 7 and 7(A) show a fluid permeable electrode assembly which includes a transversely permeable article in accordance with the present invention.
Figures 7, 7A:
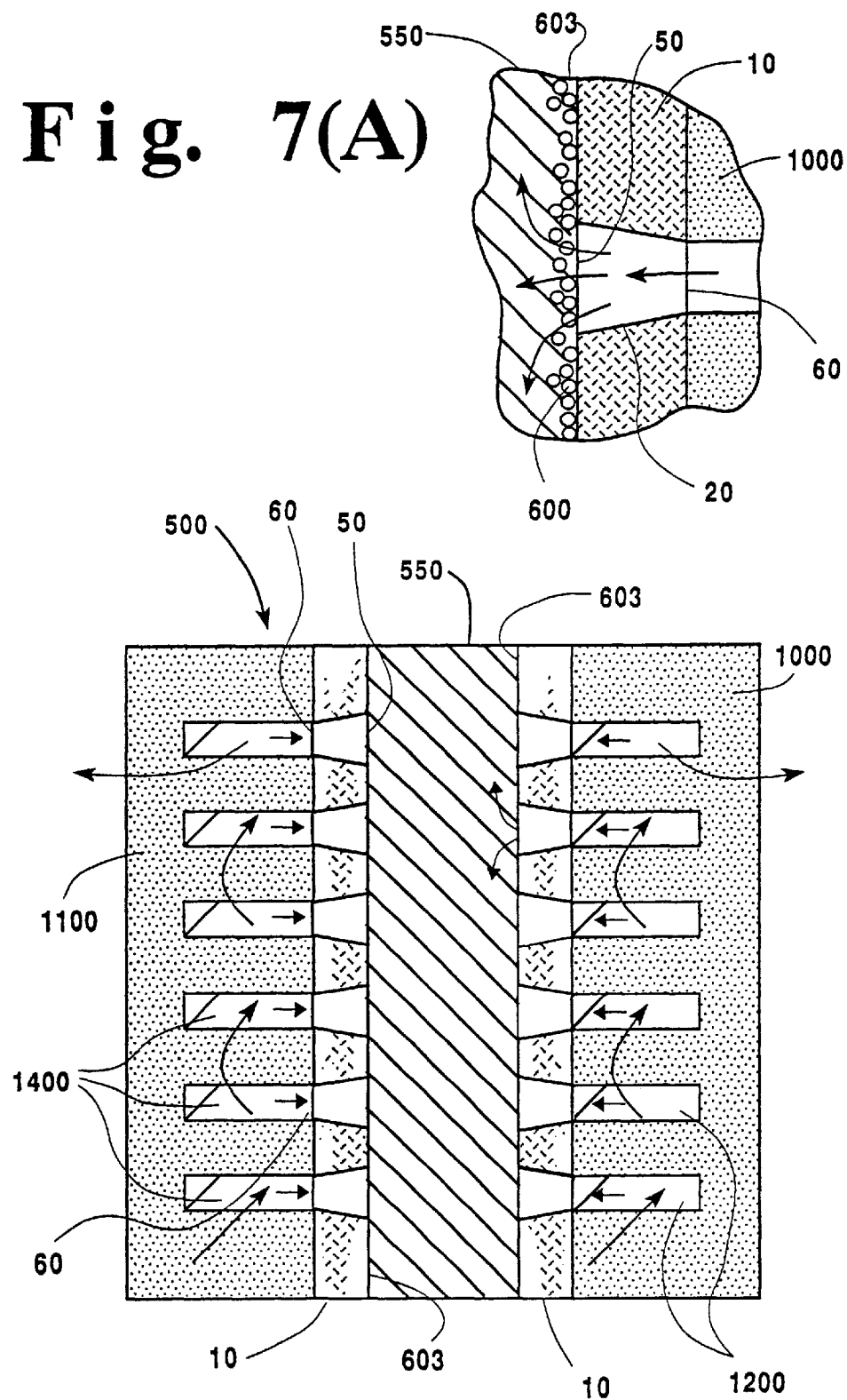

The perforated gas permeable flexible graphite sheet 10 of FIG. 1 can be used as an electrode in an electrochemical fuel cell 500 shown schematically in FIGS. 6, 7 and 7(A).

FIG. 6, FIG. 7 and FIG. 7(A) show, schematically, the basic elements of an electrochemical Fuel Cell, more complete details of which are disclosed in U.S. Pat. Nos. 4,988,583 and 5,300,370 and PCT WO 95/16287 (Jun. 15, 1995) and each of which is incorporated herein by reference.

With reference to FIG. 6, FIG. 7 and FIG. 7(A), the Fuel Cell indicated generally at 500, comprises electrolyte in the form of a plastic e.g. a solid polymer ion exchange membrane 550; perforated flexible graphite sheet electrodes 10 in accordance with the present invention; and flow field plates 1000, 1100 which respectively abut electrodes 10. Pressurized fuel is circulated through grooves 1400 of fuel flow field plate 1100 and pressurized oxidant is circulated through grooves 1200. In operation, the fuel flow field plate 1100 becomes an anode, and the oxidant flow field plate 1000 becomes a cathode with the result that an electric potential, i.e. voltage is developed between the fuel flow field plate 1000 and the oxidant flow field plate 1100. The above described electrochemical fuel cell is combined with others in a fuel cell stack to provide the desired level of electric power as described in the above-noted U.S. Pat. No. 5,300, 370.

One significant difference lies in the fact that the catalyst 600 is loaded on the electrode 10 of the present invention. In this way, the catalyst metal is only present on the transverse channels through electrode 10 rather than relatively uniformly distributed on the ion exchange membrane and, therefore, the amount of catalyst employed is minimized while maximizing the effectiveness of the catalyst, especially where the catalyst is only loaded at or near where the walls of electrode 10 abut ion exchange membrane 550. This is because catalyst is now only disposed at the channels through which the gasses are passing.

The operation of Fuel Cell 500 requires that the electrodes 10 be porous to the fuel and oxidant fluids, e.g. hydrogen and oxygen, to permit these components to readily pass from the grooves 1400, 1200 through electrodes 10 to contact the catalyst 600 on the surfaces of the channels 20, as shown in FIG. 7(A), and enable protons derived from hydrogen to migrate through ion exchange membrane 550. In the electrode 10 of the present invention, channels 20 are positioned to adjacently cover grooves 1400, 1200 of the flow field plates so that the pressurized gas from the grooves passes through the smaller openings 60 of channels 20 and exits the larger openings 50 of channels 20. The initial velocity of the gas at the smaller openings 60 is higher than the gas flow at the larger openings 50 with the result that the gas is slowed down when it contacts the catalyst 600 on the surfaces of channels 20 and the residence time of gas-catalyst contact is increased and the area of gas exposure at the membrane 550 is maximized. This feature, together with the increased electrical conductivity of the flexible graphite electrode of the present invention enables more efficient fuel cell operation. Of course, it will be recognized that there are situations where it may be desirable to orient electrode 10 such that pressurized gas from the grooves 1400 or 1200 of the flow field plates 1000, 1100 passes through the larger opening 50 of channels 20 and exits through the smaller openings 60 of channels 20.

Figure 8:
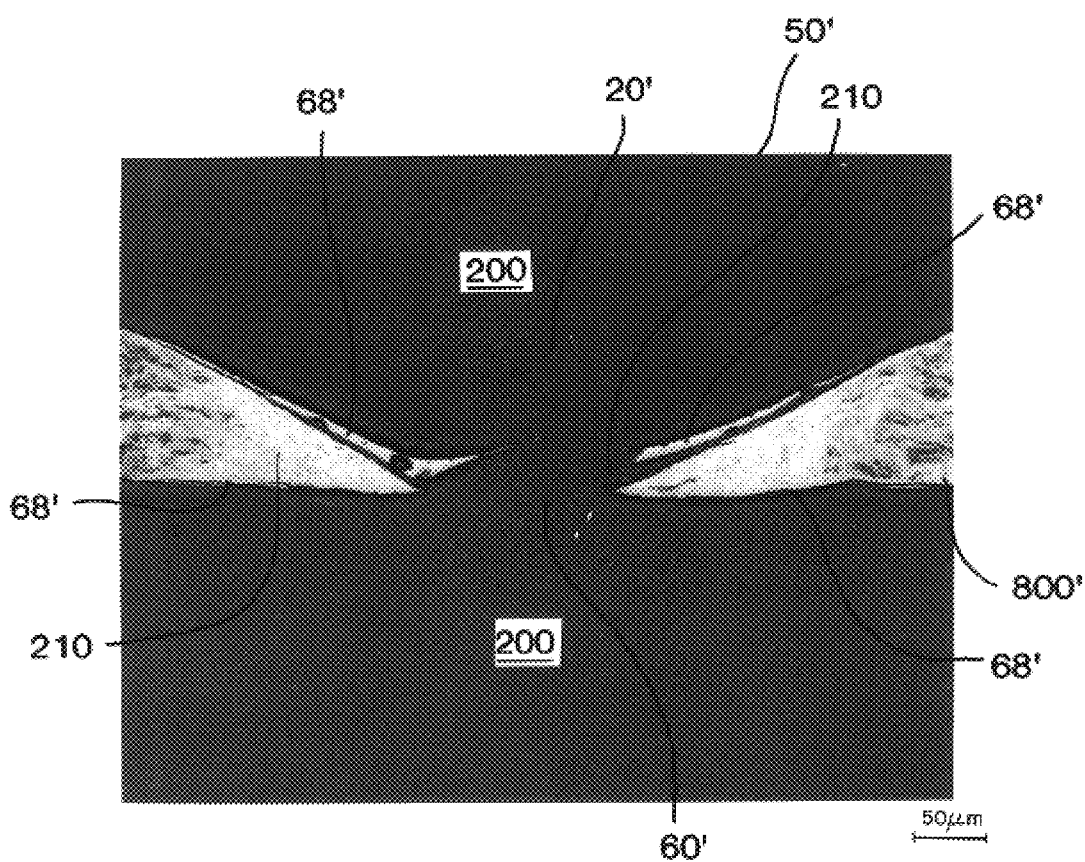
FIG. 8 is a photograph at 100×(original magnification) corresponding to a portion of the side elevation view sketch of FIG. 5.

FIG. 8 is a photograph (original magnification 100×) of a body of flexible graphite corresponding to a portion of the sketch of FIG. 5.

The articles of FIGS. 1 and 5 and the material shown in the photograph (100×) of FIG. 8 can be shown to have increased thermal and electrical conductivity in the direction transverse to opposed parallel, planar surfaces 30, 40 as compared to the thermal and electrical conductivity in the direction transverse to surfaces 130, 140 of the material of FIG. 4 in which particles of expanded natural graphite unaligned with the opposed planar surfaces are not optically detectable.

A sample of a sheet of flexible graphite 0.01 inch thick having a density of 0.3 grams/cc, representative of FIG. 4, was mechanically impacted by a device similar to that of FIG. 3 to provide channels of different size in the flexible graphite sheet. The transverse ("c" direction) electrical resistance of the sheet material samples was measured and the results are shown in the table below.

Also, the transverse gas permeability of channeled flexible graphite sheet samples, in accordance with the present invention, was measured, using a Gurley Model 4118 for Gas Permeability Measurement.

Samples of channeled flexible graphite sheet in accordance with the present invention were placed at the bottom opening (⅜ in. diam.) of a vertical cylinder (3 inch diameter cross-section). The cylinder was filled with 300 cc of air and a weighted piston (5 oz.) was set in place at the top of the cylinder. The rate of gas flow through the channeled samples was characterized by measuring the time of descent of the piston and the results are shown in the table below.

| | Flexible Graphite Sheet (0.01 inch thick; density = 0.3 gms/cc) | | |
|---|---|---|---|
| | No Channels | 1600 channels per square inch - 0.020 inch wide at top; 0.005 inch wide at bottom | 250 channels per square inch - 0.020 inch wide at top; 0.007 inch wide at bottom |
| Transverse Electrical Resistance (micro ohms) | 80 | 8 | 0.3 |
| Diffusion Time - Seconds | — | 8 seconds | 30 seconds |

In the present invention, for a flexible graphite sheet having a thickness of 0.07 mm to 0.4 mm adjacent the channels and a density of 0.5 to 1.5 grams per cubic centimeter, the preferred channel density (or count) is from 1000 to 3000 channels per square inch and the preferred channel size is a channel in which the ratio of the area of larger channel opening to the smaller is from 50:1 to 150:1.

In producing an article in accordance with the present invention, a sheet of compressed expanded graphite particles having transverse channels, as illustrated in FIG. 1 and FIG. 2, is treated, e.g. by dipping, with a solution of non-graphitizing, organic thermo-setting resin, e.g. liquid resol phenolic resin in furfural which may advantageously include the cellulosic precursors noted above. The solution covers and penetrates the surface of the sheet and is subsequently dried and heated to cure and thermoset the resin and thereafter heated to temperatures of 500° C. and higher, e.g. up to about 1600° C., to convert the thermoset resin to glassy carbon. Furthermore, in preparing a high surface area electrode 10 such as shown in FIG. 11, particles of natural cellulosic materials, e.g. in the form of shredded newspaper, cotton linters, wood pulp, and the like may be treated with an activating agent and also applied to or incorporated within a resin coated sheet of compressed expanded graphite particles before the resin has fully dried. Thereafter the resin-coated sheet, with applied or incorporated natural cellulosic particles bonded thereto or embedded therein, is heated to cure and thermoset the resin and convert the resin to glassy carbon; in the course of this heat treatment, the applied and incorporated natural cellulosic particles are converted to high surface area activated carbon.

Procedures for activating and carbonizing cellulosic precursors are disclosed in U.S. Pat. No. 5,102,855, the disclosure of which is incorporated herein by reference.

The article of the present invention can also be used as electrical and thermal coupling elements for integrated circuits in computer applications, as conformnal electrical contact pads and as electrically energized grids in de-icing equipment.

The above description is intended to enable the person skilled in the art to practice the invention. It is not intended to detail all of the possible variations and modifications that will become apparent to the skilled worker upon reading the description. It is intended, however, that all such modifications and variations be included within the scope of the invention that is defined by the following claims. The claims are intended to cover the indicated elements and steps in any arrangement or sequence that is effective to meet the objectives intended for the invention, unless the context specifically indicates the contrary.

What is claimed is:

1. A membrane electrode assembly comprising a pair of electrodes and an ion exchange membrane positioned between the electrodes, at least one of the electrodes being formed of a sheet of a compressed mass of expanded graphite particles having a plurality of transverse fluid channels passing through the sheet between first and second opposed surfaces of the sheet, the channels being separated by walls of compressed expandable graphite, the walls formed on one of the opposed surfaces abutting the ion exchange membrane, at least some of the walls of the transverse fluid channels having glassy carbon thereon or therein, wherein the channel openings at the first surface are larger than the channel openings at the second surface.

2. The assembly of claim 1 wherein the compressed mass of expanded graphite particles is characterized by expanded graphite particles adjacent the channels extending obliquely with respect to the opposed surfaces.

3. The assembly of claim 1 wherein the graphite sheet has a thickness of 0.07 mm to 0.4 mm adjacent said channels and a density of 0.5 to 1.5 grams per cubic centimeter.

4. The assembly of claim 1 wherein at least a portion of the glassy carbon is activated.

5. The assembly of claim 4 wherein a catalyst material is loaded on the activated glassy carbon.

6. The assembly of claim 5 where the catalyst material is loaded on the activated glassy carbon at or near the location where the walls of the channels abut the ion exchange membrane.

7. The assembly of claim 1 wherein carbonized and activated natural cellulosic particles are bonded to the glassy carbon.

8. The assembly of claim 6 wherein a catalyst material is loaded on the activated natural cellulosic particles.

9. A graphite article comprising a sheet of a compressed mass of expanded graphite particles having a plurality of transverse fluid channels passing through the sheet between first and second parallel, opposed surfaces of the sheet, the surfaces of at least some of the transverse fluid channels having glassy carbon thereon or therein,; wherein the channel openings at the first surface are larger than the channel openings at the second surface.

10. The article of claim 9 wherein the compressed mass of expanded graphite particles is characterized by expanded graphite particles adjacent the channels extending obliquely with respect to the parallel opposed surfaces.

11. The article of claim 9 wherein the graphite sheet has a thickness of about 0.07 mm to 0.4 mm adjacent said channels and a density of about 0.5 to 1.5 grams per cubic centimeter.

12. The article of claim 9 wherein at least a portion of the glassy carbon is activated.

13. The article of claim 12 wherein a catalyst material is loaded on the activated glassy carbon.

14. The article of claim 9 wherein carbonized and activated natural cellulosic particles are bonded to the glassy carbon.

15. The article of claim 14 wherein a catalyst material is loaded on the activated natural cellulosic particles.

* * * * *

UNITED STATES PATENT AND TRADEMARK OFFICE
CERTIFICATE OF CORRECTION

PATENT NO.    : 6,413,663 B1
DATED         : July 2, 2002
INVENTOR(S)   : Mercuri It is certified that error appears in the above-identified patent and that said Letters Patent is hereby corrected as shown below:

<u>Column 1,</u>
Line 23, "...energy. ,The protons..." should read as -- ...energy. The protons... --

<u>Column 6,</u>
Line 5, "...complete if displacement..." should read as -- ...complete displacement... --

<u>Column 12,</u>
Line 28, "...or therein,; wherein..." should read as -- ... or therein, wherein... --

Signed and Sealed this

Eleventh Day of February, 2003

JAMES E. ROGAN
*Director of the United States Patent and Trademark Office*